(12) United States Patent
Barat et al.

(10) Patent No.: US 7,885,775 B2
(45) Date of Patent: Feb. 8, 2011

(54) PROCESSING OF A SIGNAL REPRESENTING RADIATION

(75) Inventors: Eric Barat, Limours en Hurepoix (FR); Thomas Dautremer, Paris (FR); Jean-Christophe Trama, Paris (FR)

(73) Assignee: Commissariat a l'Energie Atomique (FR)

( * ) Notice: Subject to any disclaimer, the term of this patent is extended or adjusted under 35 U.S.C. 154(b) by 1761 days.

(21) Appl. No.: 11/057,650

(22) Filed: Feb. 14, 2005

(65) Prior Publication Data

US 2006/0126763 A1 Jun. 15, 2006

(30) Foreign Application Priority Data

Dec. 15, 2004 (FR) .................................. 04 13325

(51) Int. Cl.
*G01R 3/00* (2006.01)
(52) U.S. Cl. .................................................. 702/69
(58) Field of Classification Search .................. 702/69, 702/70, 76, 77, 134, 136, 40, 182–185
See application file for complete search history.

(56) References Cited

U.S. PATENT DOCUMENTS

| 4,395,636 A * | 7/1983 | Anger et al. ................. 250/366 |
| 5,005,146 A | 4/1991 | Lakatos et al. |
| 5,067,090 A | 11/1991 | Seeman |
| 5,307,299 A | 4/1994 | Stein et al. |
| 5,349,193 A | 9/1994 | Mott et al. |
| 5,393,982 A | 2/1995 | Mott et al. |
| 5,489,782 A * | 2/1996 | Wernikoff .................... 250/369 |
| 5,684,850 A | 11/1997 | Warburton |
| 5,774,522 A | 6/1998 | Warburton |
| 5,821,533 A | 10/1998 | Bingham et al. |
| 5,870,051 A | 2/1999 | Warburton et al. |
| 5,872,363 A | 2/1999 | Bingham et al. |
| 5,873,054 A | 2/1999 | Warburton et al. |
| 5,884,234 A | 3/1999 | Jorion et al. |
| 5,912,825 A | 6/1999 | Bingham |
| 6,295,508 B1 | 9/2001 | Trammell et al. |

(Continued)

FOREIGN PATENT DOCUMENTS

DE 197 30 679 1/1998

OTHER PUBLICATIONS

Radeka, "Optimum Signal-Processing For Pulse-Amplitude Spectrometry In The Presence Of High-Rate Effects And Noise", IEEE Trans.nucl.Sci., NS15, pp. 455-470, 1968.

(Continued)

*Primary Examiner*—Edward Raymond
(74) *Attorney, Agent, or Firm*—Lerner, David, Littenberg, Krumholz & Mentlik, LLP

(57) ABSTRACT

The invention proposes a method of processing a noisy digital time signal $y_k$ corresponding to an initial time signal $x_t$ after having been conditioned by a conditioning chain, the said initial signal $x_t$ representing information about radiations coming from a radiation source, these radiations having an energy distribution, characterised in that a state model is implemented, representing the conditioning imposed by the said chain to pass from the initial time signal $x_t$ to the noisy digital time signal $y_k$ in order to obtain from the noisy digital time signal $y_k$ a non-noisy digital estimate signal of the initial time signal $x_t$.

The invention furthermore proposes a system capable of implementing said method.

38 Claims, 9 Drawing Sheets

U.S. PATENT DOCUMENTS

| | | |
|---|---|---|
| 6,347,288 B1 | 2/2002 | Trammell et al. |
| 6,369,393 B1 | 4/2002 | Jordanov |
| 6,374,192 B1 | 4/2002 | Brogle et al. |
| 6,522,984 B1 | 2/2003 | Jordanov |
| 6,587,003 B2 | 7/2003 | Jordanov |
| 6,587,814 B1 | 7/2003 | Warburton et al. |
| 6,609,075 B1 | 8/2003 | Warburton et al. |
| 2005/0129152 A1 | 6/2005 | Hillstrom |

OTHER PUBLICATIONS

Bertolaccini et al., "Optimum Processing For Amplitude Distribution Evaluation Of A Sequence Of Randomly Spaced Pulses", Nuclear Instruments And Methods, vol. 61, pp. 84-88, 1968.

Knoll, "Radiation Detection and Measurement", 2nd edition, Chapter 16, Pulse processing and shaping, pp. 555-583, 1989.

Gatti et al., "Optimum Filters For Detector Charge Measurements in Presence of $1/f$ Noise", Nuclear Instruments and Methods in Physic Research, A287, pp. 513-520, 1990.

Lakatos, "Adaptive Digital Signal Processing For X-Ray Spectrometry", Nuclear Instruments and Methods in Physics Research, B47, pp. 307-310, 1990.

Georgiev et al., "Digital Pulse Processing in High Resolution, High Throughput Gamma-Ray Spectroscopy", IEEE Transactions on Nuclear Science, vol. 40, No. 4, pp. 770-779, Aug. 1993.

Jordanov et al., "Digital techniques for real-time pulse shaping in radiation measurements", Nuclear Instruments and Methods in Physics Research, A 353, pp. 261-264, 1994.

Jordanov et al., "Digital synthesis of pulse shapes in real time for high resolution radiation spectroscopy", Nuclear Instruments and Methods in Physics Research, A 345, pp. 337-345, 1994.

Ripamonti et al. "Multiple delay line shaping: a new class of weighting functions suitable for digital processing", Nuclear Instruments and Methods in Physics Research, A 340, pp. 584-593, 1994.

Jordanov, "Deconvolution of pulses from a detector-amplifier configuration", Nuclear Instruments and Methods in Physics Research, A 351, pp. 592-594, 1994.

Niedzwiecki, "Adaptive Scheme for Elimination of broadband noise and impulsive Disturbances from AR and ARMA Signals", IEEE Transactions on Signal Processing, vol. 44, No. 3, pp. 528-537, Mar. 1996.

Gatti et al., "Optimum filter for $1/f$ current noise smoothed-to-white at low frequency", Nuclear Instruments and Methods in Physics Research, A 394, pp. 268-270, 1997.

Pullia et al., "Quasi-optimum $\gamma$ and X spectroscopy based on real-time digital techniques", Nuclear Instruments and Methods in Physics Research, A 439. pp. 378-384, 2000.

Partial International Search Report, PCT/EP2005/056790.

French Search Report dated Sep. 30, 2005.

* cited by examiner

PROCESSING OF A SIGNAL REPRESENTING RADIATION

CROSS-REFERENCE TO RELATED APPLICATIONS

This application claims the benefit of French Application No. 0413325 filed on Dec. 15, 2004.

BACKGROUND OF THE INVENTION

The field of the present invention concerns the treatment of a noisy time signal constituting an information support enabling characterisation of a set of events produced randomly by a source of events.

It is in fact known that a spectrum obtained from particle sources may comprise energy rays which are characteristic of it.

There may consequently be obtained from a measurement of the particle source, a spectrum whose examination by a specialist or by software enables information to be obtained about the said particle source.

Examination enables identification of the nature of the particle source.

By way of non-limiting example, in the field of gamma rays, a system of the said type may provide a ray spectrum such as shown in FIG. 1, which enables to identify the radio-elements which compose this source and so to characterise the latter.

It will be noted as an indication that FIG. 1 shows in particular a normalised energy spectrum for cesium 137.

In order now to explain a typical operation of state of the art systems mentioned above, an example in the field of gamma spectrometry will be used.

One skilled in the art will of course be able to extend this example without difficulty to other categories of radiation such as those mentioned above.

FIG. 2 shows, by way of example, a signal which could ideally be observed immediately at the output of a gamma photon detector.

This signal comprises plural pulses of different amplitude and duration representing, for example, a current developed in the detector by the flow of a photon.

It will be noted here that a pulse may also represent a voltage in the detector.

In all cases, in the following text the signal provided by the detector will be termed the detector current signal.

To briefly return to the pulses, their width, corresponding to a certain time duration, is a function of the charge collection time.

As mentioned above, the detector current signal shown in FIG. 2 is ideal.

Consequently such a signal is never observable.

In reality, a preamplifier is generally installed at the output of the detector, in order to implement a first shaping of the detector current signal.

Two types of preamplifiers are generally found in the existing systems: preamplifiers with capacitive feedback and preamplifiers with resistive feedback.

By way of indication, FIGS. 3 and 4 show a detector 1 respectively followed by a preamplifier with capacitive feedback 2 and by a preamplifier with resistive feedback 3 which comprises a feedback loop, composed of a capacitor 5 and a resistor 6 in parallel, between an output and an input of an amplifier 4.

These preamplifiers are generally followed by a differentiator circuit 7 in the case of a capacitive feedback and by a pole-zero PZ correction circuit 8 in the case of a resistive feedback.

The two FIGS. 5 and 6 respectively show an example of an ideal time signal at the output of the two said types of preamplifiers upon input excitation by the same detector current signal, it being understood that electronic noise is not shown here.

Several steps follow that of preamplification; their order and their implementation may vary considerably.

A known and important step consists of shaping the pulses to extract information of energy type therefrom.

Such a step is generally termed an "energy" shaping step.

By way of non-limiting example, information may be extracted from a measurement of the amplitude or of the area of each pulse.

In fact, it is supposed that these quantities are generally proportional to energy.

The choice of the type of "energy" shaping has in recent years been the subject of considerable research in the field of the invention; this delicate step necessitates numerous compromises.

For example, in the case of extracting information from the pulse amplitude, a compromise desires the existence of an optimum between:

obtaining the information very precisely, that is, a high resolution, the number of pulses per unit time present in the detector current signal, and the fraction among them which it is desired to retain in the spectrum, for example because of a phenomenon, known per se, which is currently termed in the field, "piling up" of pulses.

For more details, the reader will be able to refer particularly to the concepts of the spectrum input rate or output count rate (OCR) and of detector output rate or input count rate (ICR).

In order to obtain an optimum solution to this compromise, articles [1], [2] have established that the use of a filter of trapezoidal shape could constitute an optimum solution in the absence of piling-up of pulses and for a certain nature of noise.

Other solutions based on such a solution have later been proposed to improve system performance.

For example, numerous possibilities are known for realising a filter of this type [1-8]: numerical, analogue, or mixed types, etc.

Solutions are also known having the aim of improving performance by another means: optimisation of said PZ correction [8,9,10,11], optimisation of said conventional operation consisting of correcting a baseline [12], rejection of piled-up pulses by correlation between the length and amplitude of a pulse which is not piled up [13], etc.

But here also, the step of energy shaping necessitates the use of the optimum trapezoidal filter.

Summing up, the proposed methods and systems comprise in all cases a trapezoidal filter, and more generally an energy shaping step, which is a disadvantage.

In fact, the performance of systems of this type, although they have been very serviceable, are nevertheless limited, since in any case this energy shaping step, and in particular the use of the said trapezoidal filter, degrades the detector current signal—at least the preamplified signal—particularly by a lengthening of the signals in time.

Consequently, a moment always arrives at which, with the pulse occurrence frequency increasing (because of an increase of events frequency, for example particle emissions), systems of this type begin to malfunction, for example producing spectra of low resolution, or deformed.

This is typically the case towards 100,000 to 200,000 counts per second (counting rate).

For more efficient systems, 300,000-400,000 counts per second may only just be expected.

Another disadvantage of the said systems is that their use does not remain very flexible.

In particular, it is not possible to adapt or modify the energy shaping step parameters during the analysis of the radiation source.

It is therefore necessary in the initial phase to know, or at least to have the best possible estimate of, the number of pulses per second, for regulating the system, and this particularly at the detection level.

And if the number of pulses is overestimated, a shorter convolution is chosen, which will degrade the resolution.

While if this number of pulses is underestimated, a too long convolution is chosen, which will lead to rejecting many pulses and distorting the spectrum.

By way of non-limiting example, systems which because of their situation cannot uniquely be adjusted when placed in service are generally adjusted to a worst case.

Adjusting to a worst case can particularly consist of adjusting the system as a function of the strongest measured pulse intensity.

But this intensity varies during the course of time, so that the system no longer operates with an optimum adjustment.

SUMMARY OF THE INVENTION

An object of the invention is therefore to eliminate the abovementioned disadvantages and so to improve the performance of existing systems.

In order to attain this object, the invention proposes a system and a method which do not use the step of energy shaping used systematically in the prior art.

For this purpose, the present invention proposes a method of processing a noisy digital time signal $y_k$ corresponding to an initial time signal $x_t$ after having been conditioned by a conditioning chain, said initial signal $x_t$ being representative of information on radiation coming from a radiation source, these radiations having an energy distribution, characterised in that a state space model is used representing the conditioning imposed by the said chain for passing from the initial time signal $x_t$ to the noisy digital time signal $y_k$, in order to obtain from the noisy digital signal $y_k$ a non-noisy digital estimation signal for the initial time signal $x_t$.

Preferred, non-limiting aspects of this method are the following:

the method furthermore comprises a preliminary step where the noisy digital time signal $y_k$ is partitioned into successive sections of N samples, so as to obtain a non-noisy digital estimation signal per section;

the state space model comprises:

a variable $m_k$ to be estimated, of hidden variable type, able to have at each sampling step k one of two values, in order to indicate the presence or absence of one or more pulses in the initial time signal $x_t$, at the instant corresponding to the step k in question, a state vector $X_k$ to be estimated, comprising a first component which corresponds to a digital representation xk of the initial time signal $x_t$ at the instant corresponding to the step k in question, the hidden variable is a Hidden Markov variable $m_k$ which may be equal, at each sampling step k, to the value 1 if the non-noisy digital estimation signal should comprise one or more pulses in the sampling step k in question, and the value 0 if the non-noisy digital estimation signal should comprise no pulse in the said sampling step k;

the method furthermore comprises a step in which an algorithm is used which processes the N samples in k increasing steps and which cooperates with the state space model to provide a filtered estimate $X_k/k$ of the state vector $X_k$, and so to provide a non-noisy filtered estimate signal $X_k/k$ which it is desired to obtain, this estimate $x_k/k$ being a filtered estimate which is conditional on the past;

the method furthermore comprises a step in which an algorithm is implemented which treats the N samples by increasing steps k and which cooperates with the state space model to provide a filtered estimate $X_k/k$ of the state vector $X_k$ and so to provide a non-noisy filtered digital estimate signal $x_k/k$ which it is desired to obtain, this filtered estimate being a filtered estimate conditional on the past from samples of the noisy digital time signal $y_k$ up to the step k in question;

the algorithm is a Kalman filter of which one observation corresponds to the noisy digital time signal $y_k$;

the method comprises a step in which the hidden variable $m_k$ is estimated at each step k, so as to obtain an occupation signal representing an estimate in the presence or not of one or more pulses at each of the steps k in question, and in that the filter is capable of determining, by means of the obtained said occupation signal, the filtered estimate $X_k/k$ of the state vector $X_k$, and so to determine the non-noisy filtered digital estimate $x_k/k$ which it is desired to obtain;

the estimation of the hidden variable $m_k$ is implemented by making a hypothesis according to which, at the instant corresponding to the sampling step k considered, no pulses exist in the initial time signal $x_t$, then verifying whether the hypothesis is true by comparing the square of an innovation I of the Kalman filter and a variable threshold determined by the latter;

the innovation I is of the form:

$$I_{k+1} = y_{k+1} - y_{k+1/k}$$

where $y_{k+1}$ is the observation at the sampling step k+1 and $y_{k+1/k}$ is a prediction of this observation, at step k+1, calculated from a prediction $X_{k+1/k}$ determined beforehand of the state vector $X_k$ at step k+1;

the threshold variable consists of a coefficient multiplied by a variance of the innovation I;

the method furthermore includes a step in which a second, smoothing algorithm is used, which treats the N samples in k decreasing steps and which enables an improved, smoothed estimate $X_k/N$ of the state vector $X_k$ to be provided and so to provide an improved, smoothed estimate $x_k/N$ of the signal which is sought, this estimate being an estimate conditional on the past, present and future, starting from samples of the observation signal $y_k$ up to step N and the samples of the state vector $X_k/k-1$ determined beforehand by the first algorithm, of the step k to N;

the smoothing algorithm is constructed so that the smoothed estimate $X_k/N$ maximises in the vector $X_k$ the probability of having the state vector $X_k$ at step k, knowing the N samples of the noisy digital time signal $y_k$, i.e. the probability:

$$p(X_k/y1 \text{ to } y_N)$$

the method furthermore comprises a step in which the energy of the radiation is determined, using the following operations:

find and memorise the step(s) k of each pulse present in the occupation signal, for each pulse, read the value of the estimate signal at the k memorised value(s) corresponding to the pulse considered, and add the values thus obtained so as to obtain an estimate of the pulse in question;

the energy of each pulse is weighted as a function of a measure of a quality obtained from the estimation signal, this measure being determined by the Kalman filter or the smoothing algorithm;

the method furthermore comprises a step in which a histogram is constructed of radiation source energy from the energies determined;

the energy histogram represents an energy spectrum;

the radiations are particle radiations;

the radiations are nuclear particle radiations;

the radiations are photon radiations;

the method furthermore comprises a step of detection of radiations which provides the initial time signal $x_t$;

the conditioning of the initial time signal $x_t$ by the conditioning chain begins with a first step in which the initial signal $x_t$ is preamplified and a sampling step is arrived at, at a predetermined frequency, so as to obtain the noisy digital time signal $y_k$.

For this purpose, a program is also proposed for performing a processing of a noisy digital time signal $y_k$ corresponding to a time signal $x_t$, the said signal $x_t$ being representative of information about radiations coming from a radiation source, these radiations having an energy distribution, characterised in that it uses the said processing method according to one or more of the preferred aspects of the said processing method, taken alone or in combination.

For this purpose, there is furthermore proposed a system of processing a noisy digital time signal $y_k$ corresponding to an initial time signal $x_t$ after having been conditioned by a conditioning chain, the said initial signal $x_t$ representing information about radiations coming from a radiation source, these radiations having an energy distribution, characterised in that it comprises means capable of implementing a state space model, representing the conditioning imposed by the said chain for passing from the initial time signal $x_t$ to the noisy digital time signal $y_k$, in order to obtain from the noisy digital time signal $y_k$ a non-noisy digital estimate signal of the initial time signal $x_t$.

Preferred, non-limiting aspects of this system are the following:

the model comprises:

a Hidden Markov variable to be estimated, which can be equal to the value 1 if the non-noisy digital estimate signal is to comprise one or more pulses in the sampling step k, and to the value 0 if the non-noisy digital estimate signal is not to comprise any pulse in the sampling step k, a state vector $X_k$ to be estimated, comprising a first component which corresponds to a digitised representation $x_k$ of the initial time signal $x_t$ at the instant corresponding to the step k in question;

the system furthermore comprises means for using a Kalman filter, an observation of which corresponds to the noisy digital time signal $y_k$, the Kalman filter cooperating with the state space model to provide a filtered estimate $X_{k/k}$ of the state vector $X_k$, and therefore to provide a non-noisy filtered digital estimate signal $x_{k/k}$ which it is desired to obtain, this filtered estimate being a filtered estimate $X_{k/k}$ conditional on the past starting from samples of the noisy digital time signal $y_k$ up to the step k in question;

the system comprises means for implementing a smoothing algorithm;

the smoothing algorithm is constructed so as to maximise in the state vector $X_k$ the probability of having the vector $X_k$ at the step k, knowing the N samples of the noisy digital time signal $y_k$; i.e., the probability:

p($X_k$/y1 to yN)

the conditioning chain comprises a preamplifier and an analogue to digital converter;

the preamplifier is of the type chosen from the following list:

preamplifier with resistive feedback;

preamplifier with capacitive feedback;

the conditioning chain furthermore comprises, at the output of the preamplifier: a pole-zero correction circuit if the preamplifier is of the type with resistive feedback, or a differentiating circuit if the preamplifier is of the type with capacitive feedback;

the conditioning chain furthermore comprises an amplifier;

the conditioning chain furthermore comprises an anti-aliasing filter;

the conditioning chain comprises successively, from upstream to downstream the preamplifier, the differentiating circuit if the preamplifier is of the type with capacitive feedback, or the pole-zero correction circuit if the preamplifier is of the type with resistive feedback, the amplifier of the anti-aliasing filter, and the analogue to digital converter;

the system comprises memory means for memorising, in particular, the signals, the state space model, the Kalman filter, and the smoothing algorithm;

the state model, the Kalman filter, and the smoothing algorithm are implemented by a calculating unit 25;

the calculating unit is a processor;

the system comprises display means for displaying, particularly, the results of the estimation.

Thus, according to the invention, one alleviates the drawbacks of a conventional step of energy shaping which necessitates various compromises and which leads in any case to degrading the detector current signal, and so the information, particularly by time elongation of the pulses which it contains.

In fact, it will be recalled that a consequence of such a compromise is to increase the phenomena of piling-up of pulses.

In the invention, the detector current signal is not treated by means of filtering of the prior art type; it is estimated, and in particular with the use of a state space model.

This model comprises a hidden variable which, once determined, permits in the first place a better knowledge of the content, in terms of pulses, of the detector current signal.

A method and a system according to the invention therefore offer numerous advantages.

In particular, the disadvantage connected with the said phenomenon of increase of piling-up of pulses appears at a counting rate much higher than in the prior art.

Another advantage concerns the flexibility of the invention.

By way of a non-limiting example, in the invention the operation of the method, in particular of the algorithms used, is automatically adapted as a function of the counting rate.

Therefore no intervention is required once the method is initialised, either for performing a new adjustment of the parameters of an algorithm, for example, or for a radical change of this, given that there is an inappropriateness in view of a counting rate which has become too high.

In the invention, resolution is automatically optimised to the counting rate.

Other aspects, aims and advantages of the invention will become more apparent on reading the following description, made with reference to the accompanying drawings.

DETAILED DESCRIPTION

Certain embodiments are directed to a method of processing a noisy digital time signal $y_k$ corresponding to an initial time signal $x_t$ after having been conditioned by a conditioning chain, said initial signal $x_t$ being representative of information on the radiation arising from a radiation source; this radiation may have an energy distribution.

Such a method, or system able to use such a method, is generally used in the context of detection, counting and measurement of events, such as emitted radiation.

It has particularly as its subject the construction of a spectrum enabling measurement and analysis of the radiation provided by the source.

It will be noted that according to the invention, there is considered as radiation any radiation capable of interacting with a detection means so as to give a usable time signal.

In this respect, and as non-limiting examples, the radiations considered by the invention particularly concern photons, in particular X and gamma, nuclear particles, or yet more generally, any particle or packet of particles.

A system of the type of the invention may therefore particularly have as its subject the construction of a spectrum having a number of detected particles at a given energy, given as a function of the energy.

This is of particular interest in the case of particle sources having an energy distribution.

Figure 7:
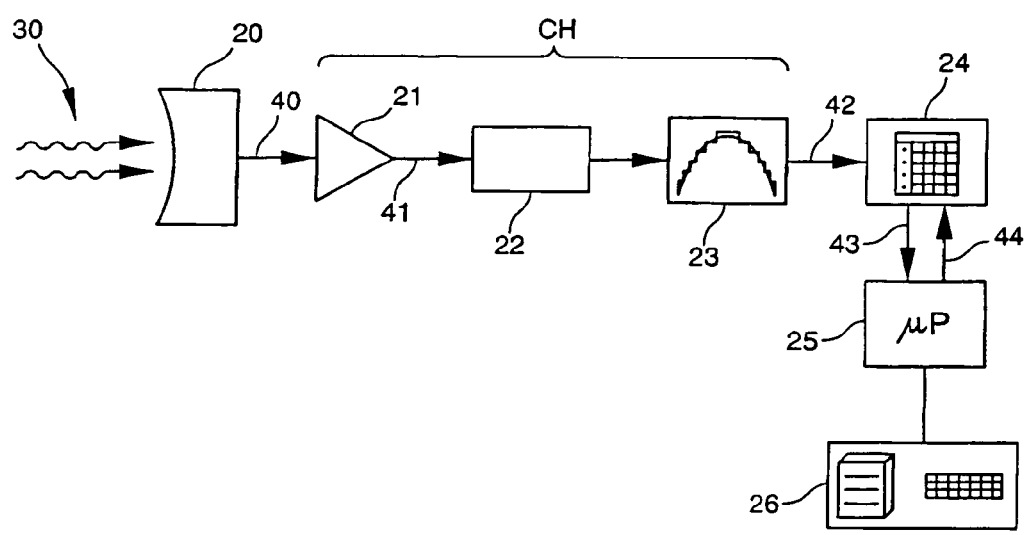
FIG. 7 shows schematically a complete system permitting the method of the invention to be implemented.

Referring now to FIG. 7, an embodiment of the system of the invention has been shown schematically.

Such a system essentially comprises a detector 20 for detecting radiations 30 coming from a radiation source.

This detector is capable of providing a detector current signal 40 which will be conditioned by a conditioning chain CH shown in FIG. 7.

This conditioning chain comprises, by way of non-limiting example, a preamplifier of the said type, that is, a type with resistive feedback or capacitive feedback.

The invention is of course not limited to these types of amplifier.

In the conditioning chain CH, the preamplified signal 41 so obtained is then passed to a block 22 in which is used a pole-zero correction circuit PZ or a differentiating circuit, according to the choice of type of preamplifier 21.

The conditioning chain CH ends in an analogue-digital converter 23 at the output of the block 22.

It will be noted that the conditioning chain CH as shown in the Figure may comprise numerous alternatives which those skilled in the art will naturally envisage.

In particular, the invention is not at all limited to such an arrangement of blocks.

In fact, it can be envisaged that the analogue-digital converter is placed upstream of the system and that the conditioning chain CH ends at the block 21 (digital preamplification), then 22.

Those skilled in the art will understand clearly that the concern here is simply with making different compromises and with choosing a suitable solution for the application aimed at.

It will also be noted that according to an alternative of the invention the block 22 may implement supplementary signal conditioning steps.

It will be seen later on, in a detailed example of an embodiment of the invention, that the block 22 may furthermore comprise circuits such as an amplifier and/or an anti-aliasing filter.

In all cases, at the end of the said conditioning chain CH, the digitised signal 42 is memorised in a dedicated memory 24, then a calculating unit 25, such as a microprocessor or a DSP (Digital Signal Processor) for example, implements calculations from samples of the memorised signal 43.

It is in particular unit 25 which implements the set of steps enabling an estimate signal to be obtained of the detector current signal (in the text hereinafter, the detector current signal will be denoted by $x_t$) and later, an energy histogram of the radiation source studied.

It will be noted that the signals corresponding to the energies of the radiations 44 calculated by the unit 25 are stored in the memory 24 (they can also be stored in a separate memory).

As can also be seen in FIG. 7, this unit 25 manages peripherals 26 such as a display screen, a keyboard, a mouse, etc.

A preferred embodiment of the method of the invention will now be described, corresponding to the treatment of the digitised signal 42 and implemented, in particular, by the calculation unit 25.

As a preliminary, it will be noted that k represents a sampling step.

In other words, it denotes a sample number and a correspondence with the notion of sampling instant may be performed using the conventional relationship:

$$t = k/fe$$

where t is the sampling instant and fe the sampling frequency of the converter 23.

It will also be noted that an index k/k of a variable will denote an estimate obtained from the first algorithm, in particular from the Kalman filter; an index k/N will denote an estimate obtained from the second algorithm, in particular from the smoothing algorithm; an index k+1/k will denote a prediction of the variable indexed as such.

Finally, $x_k$ will denote a digital representation, which it is desired to estimate, of the signal $x_t$.

According to a preferred mode of the method of the invention, the calculation unit 25 first of all proceeds to a segmentation of the signal 42 which has been memorised beforehand in the memory 24.

Such a segmentation is constructed so as to obtain successive segments or partitions of N samples.

Now, as can be seen, the calculation unit 25 will then deduce the noisy digital time signal $y_k$ from the signal 42.

An estimation signal per constituted segments will then be obtained by using the method of the invention.

In this respect, in order to arrive at the best possible estimate of the signal $x_t$ starting from the signal $y_k$, the calculating unit 25 uses a state space model representative of the conditioning imposed by said chain CH to pass from the signal $x_t$ to the signal $y_k$.

The state space model includes a hidden variable, denoted $m_k$, that is, a variable to be determined, but which may only be equal to a choice of two distinct values.

One of the values corresponds to an indication according to which, at the sampling instant corresponding to the step k considered, the signal $x_t$ comprises one or more pulses, while the other value corresponds to an indication according to which, at the said sampling instant, the signal $x_t$ contains no pulses.

In particular, in the case of presence of at least one pulse at a step k, the value is 1, and in the case of absence of pulses, the value is 0.

In this way, starting from this hidden variable $m_k$, a binary signal is available which provides a first item of information on the signal $x_t$, namely an occupation state of this signal.

The binary signal will hereinafter be termed the occupation signal.

According to a preferred mode of the invention, the hidden variable is a Markov variable such that the state space model becomes a Hidden Markov Model (HMM) type.

An example of this state space model is presented below.

The digitised signal 42 output from the converter 23 will be denoted as $d_k$ in the following equations.

Furthermore, the noisy digital time signal $y_k$ will also be termed the observation signal $y_k$.

A transfer function of the preamplifier 21 and of the element 22 constituting a differentiating circuit or P/Z is written:

$$T(z) = \frac{1-\beta}{1-\beta z^{-1}} \text{ with } \beta = e^{-2\pi f_p T_e}$$

where $T_e$ is the sampling period and $f_p$ is the frequency of the residual pole after P/Z or differentiation.

Figure 8:
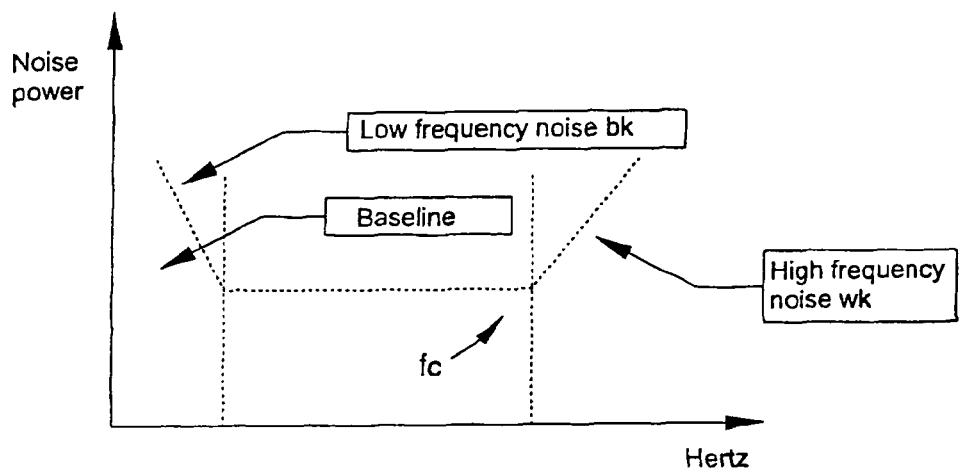
FIG. 8 shows graphically, by way of a non-limiting example, a model of noise included in the state space model.

Setting $$y_k = \frac{d_k}{1-\beta} - \frac{\beta}{1-\beta} d_{k-1}$$

the conditioning chain may now be described by the following state system:

$$\begin{cases} X_k = F \cdot X_{k-1} + D(m_k) \cdot W_k \\ y_k = H \cdot X_k \text{ with } X_k = \begin{bmatrix} x_k \\ b_k \\ w_k \\ v_k \end{bmatrix} \end{cases}$$

where $X_k$ is a state vector whose estimate is sought, this vector comprising as first component said digital representation $x_k$ which it is desired to estimate from the signal $x_t$, $m_k$ is the Hidden Markov variable, or in other words said occupation signal, it will furthermore be noted that no a priori form is given to $x_t$, apart from its being positive, $b_k$ is a bias corresponding to a baseline of the form $b_k = b_{k-1} + \eta_k$, $\eta_k$ being a gaussian random variable with mean zero and standard deviation $\sigma_b$, $w_k$ is an observation noise connected to $y_k$ of the form: $w_k = \epsilon_k - \alpha \epsilon_{k-1}$, $\epsilon_k$ being a gaussian random variable with mean zero and standard deviation $\sigma_n$, $\alpha$ being a characteristic time constant of the observation noise $w_k$, attached to a characteristic frequency $f_c$ of this noise having the following form: $\alpha = e^{-2\pi f_c T_e}$, it will be noted that in this example of a state space model, the noise model used is identical to that considered in the conventional approaches, for example in the publications [1] and [2]; in this respect, FIG. 8 schematically shows this noise model in terms of power as a function of the frequency, $v_k$ is an internal state noise connected to $\epsilon_k$ by a relation of the form: $v_k = -\alpha \epsilon_k$ $W_k$ is a noise vector of the form:

$$w_k = \begin{bmatrix} \mu_k \\ \eta_k \\ \varepsilon_k \end{bmatrix}$$

where $\mu_k$ is a dynamic noise, a gaussian random variable with mean zero and standard deviation $\sigma_p$, F is a transition matrix of the form:

$$F = \begin{bmatrix} 0000 \\ 0100 \\ 0001 \\ 0000 \end{bmatrix}$$

H is an observation matrix of the form:

H=[1110]

D($m_k$) is a matrix termed jump, of the form:

$$D(m_k) = \begin{bmatrix} m_k & 0 & 0 \\ 0 & 1 & 0 \\ 0 & 0 & 1 \\ 0 & 0 & -\alpha \end{bmatrix}$$

Finally there are defined:
N the length of a segment, or else the last index k possible in the segment,
Q and H', matrices of the following form:

$$Q = \begin{bmatrix} \sigma_p^2 00 \\ 0\sigma_b^2 0 \\ 00\sigma_n^2 \end{bmatrix} \text{ and } H' = [0110]$$

Therefore, according to the above equations, it may be seen that a knowledge of the state vector $X_k$ automatically leads to the knowledge of $x_k$.

Consequently, it could be considered in the following text that the estimate of a component of a vector ($x_k$ for example) will in all cases be deduced from an estimate of the vector including this component ($x_k$, according to the said example).

Now taking account of the above equations, the observation signal $y_k$ can be expressed as follows:

$y_k = x_k + b_k + w_k$

Figure 1:
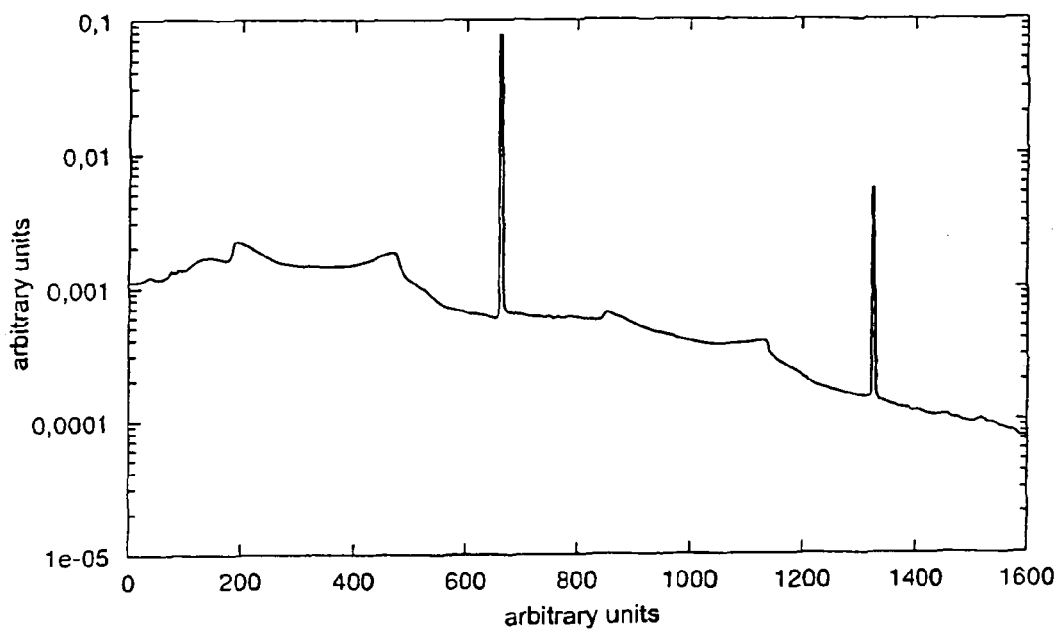
FIG. 1, mentioned in the above text, illustrates an energy spectrum of a cesium 137 source; the units of the axes are arbitrary, FIG. 2, mentioned in an example above, illustrates an ideal detector current signal generated by a gamma-ray detector; the units of the axes are arbitrary.
Figure 2:
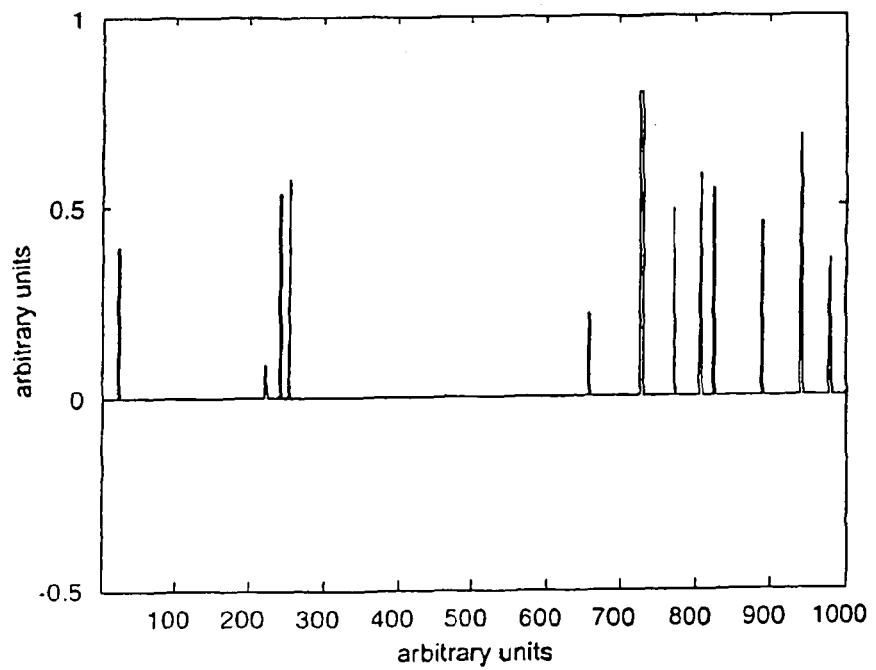
Figure 3:
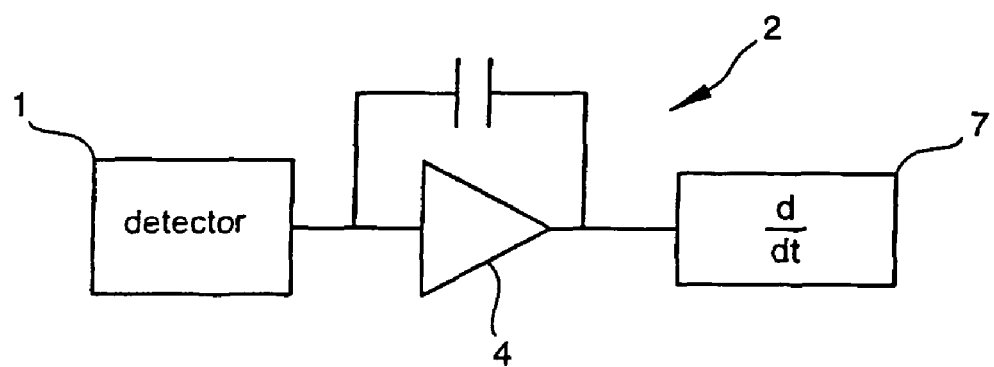
FIG. 3 shows schematically a first example of a portion of a known conditioning chain, comprising downstream of a detector: a preamplifier with capacitive feedback, followed by a differentiating circuit.
Figure 4:
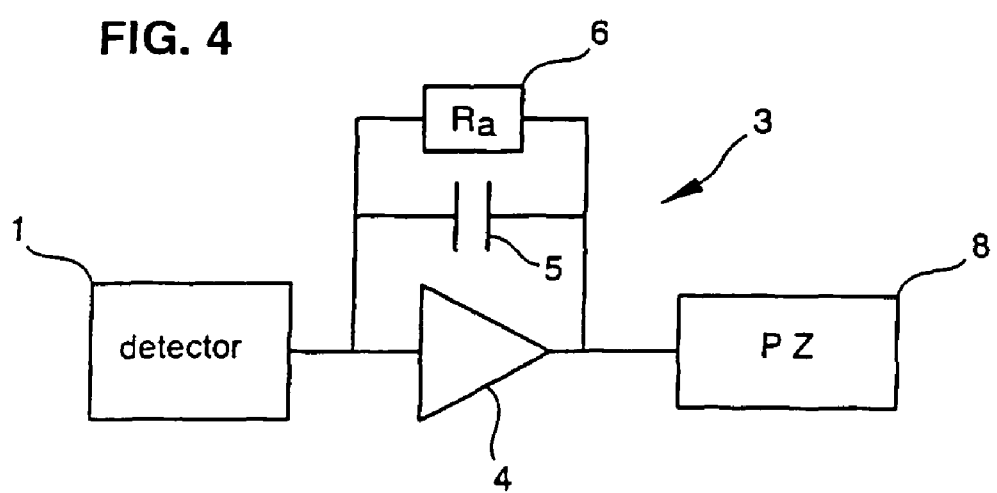
FIG. 4 shows schematically a second example of a portion of a known conditioning chain, comprising, downstream of the detector: a preamplifier with resistive feedback, followed by a pole-zero correction circuit.
Figure 5:
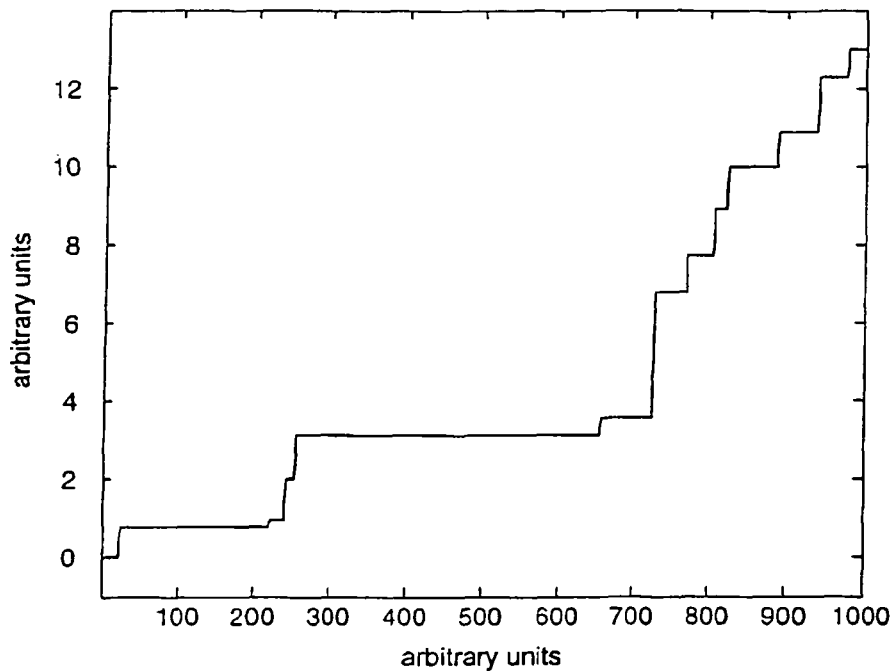
FIG. 5 shows, in non-limiting fashion, a signal output from the conditioning chain of the first example, this chain furthermore comprising an analogue-digital converter, the units of the axes being arbitrary.
Figure 6:
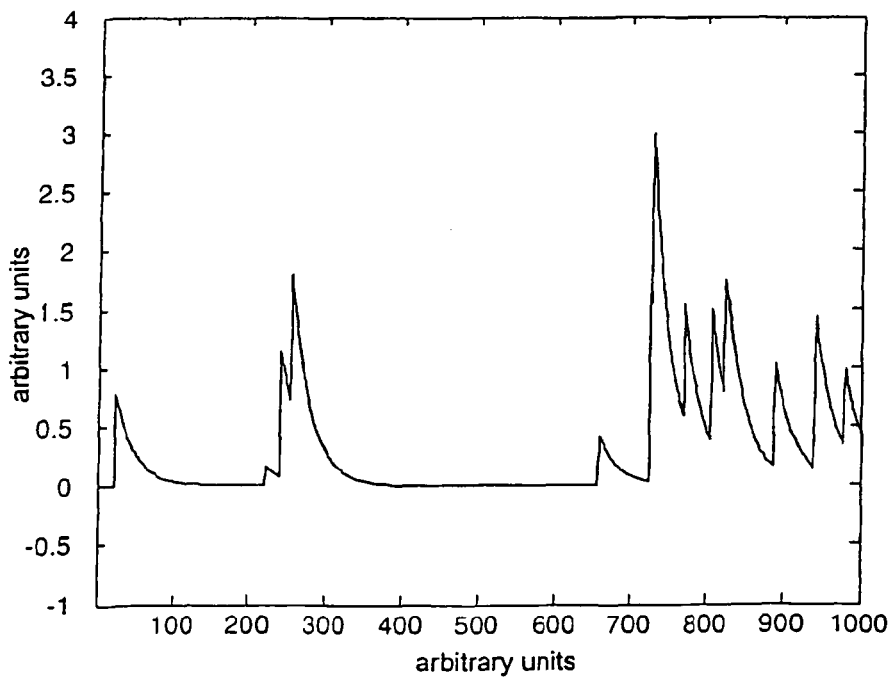
FIG. 6 shows, in non-limiting fashion, a signal output from the chain of the second example, this chain furthermore comprising an analogue-digital converter, the units of the axes being arbitrary.
Figure 9:
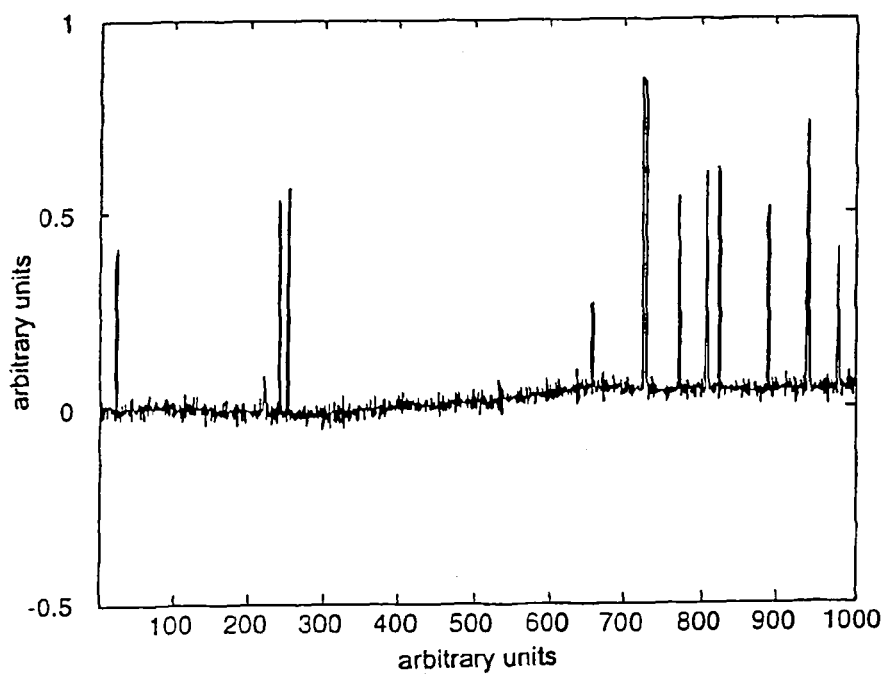
FIG. 9 shows, by way of non-limiting indicative example a result of simulation of an observed time signal $y_k$ when the detector current signal is that shown in FIG. 2.

In order to illustrate the possible form of such a signal, FIG. 9 shows, by way of indication and without limitation, a result of simulation of the observed time signal $y_k$ when the ideal detector current signal corresponds to that shown in FIG. 2.

The state space model being established in this way, provision is made in a preferred mode of the invention for implementation of an algorithm which treats the N samples of a segment by k increasing steps and which cooperates with the state space model to provide a first filtered estimate $X_k/_k$ of the vector state $X_k$, determining at the same time the occupation signal.

As mentioned previously, the filtered estimate Xk/k inevitably provides a filtered estimate $x_k/_k$ of $x_k$.

It will be noted that such an estimate represents an estimate which is conditional on the past, this expression meaning for a statistician that it has been implemented essentially from observation samples $y_k$ up to the step k in question.

In the embodiment presented here, the algorithm is a Kalman filter and the observation of this filter is the observation signal $y_k$.

As will be seen below, the method of the estimation of $X_k$ by means of the filter comprises two steps.

The first step consists of determining all the $m_k$, i.e., the whole occupation signal, and the second step uses the occupation signal for updating the parameters of the state space model and thereby obtaining the filtered estimate $X_k/_k$.

In the first step, the determination of the occupation signal $m_k$ is implemented by making a hypothesis according to which, at the instant corresponding to the sampling step k considered, there is no pulse in the initial time signal $x_t$.

The variable $m_k$ is therefore initially equal to 0 whatever the value of the step k.

This hypothesis is then verified by comparing the square of an innovation I of the Kalman filter and a threshold variable predetermined by the latter.

According to the invention, the innovation expresses the difference between the observation $y_k$ and the prediction of it from a prediction $X_k+1/_k$ of $X_k$.

More precisely, the innovation I at a step k+1 may be expressed as follows:

$I_{k+1} = y_{k+1} - y_{k+1/k}$ where $y_k+1$ is the observation at the sampling step k+1 and $y_k+1/_k$ is the prediction of this observation at step k+1, given the k first samples, this being calculated from the prediction $X_k+1/_k$ determined beforehand of the state vector $X_k$ at the step k+1, given the first k samples.

If at a step k the innovation has a value greater than the said threshold, it is considered that the said hypothesis is not verified, that is, that at the step in question, the variable has to be equal to 1 such that the occupation signal contains a pulse.

In a preferred mode of the invention, the threshold value permitting the comparison with the innovation is a multiple of the variance of the innovation I.

Figure 10:
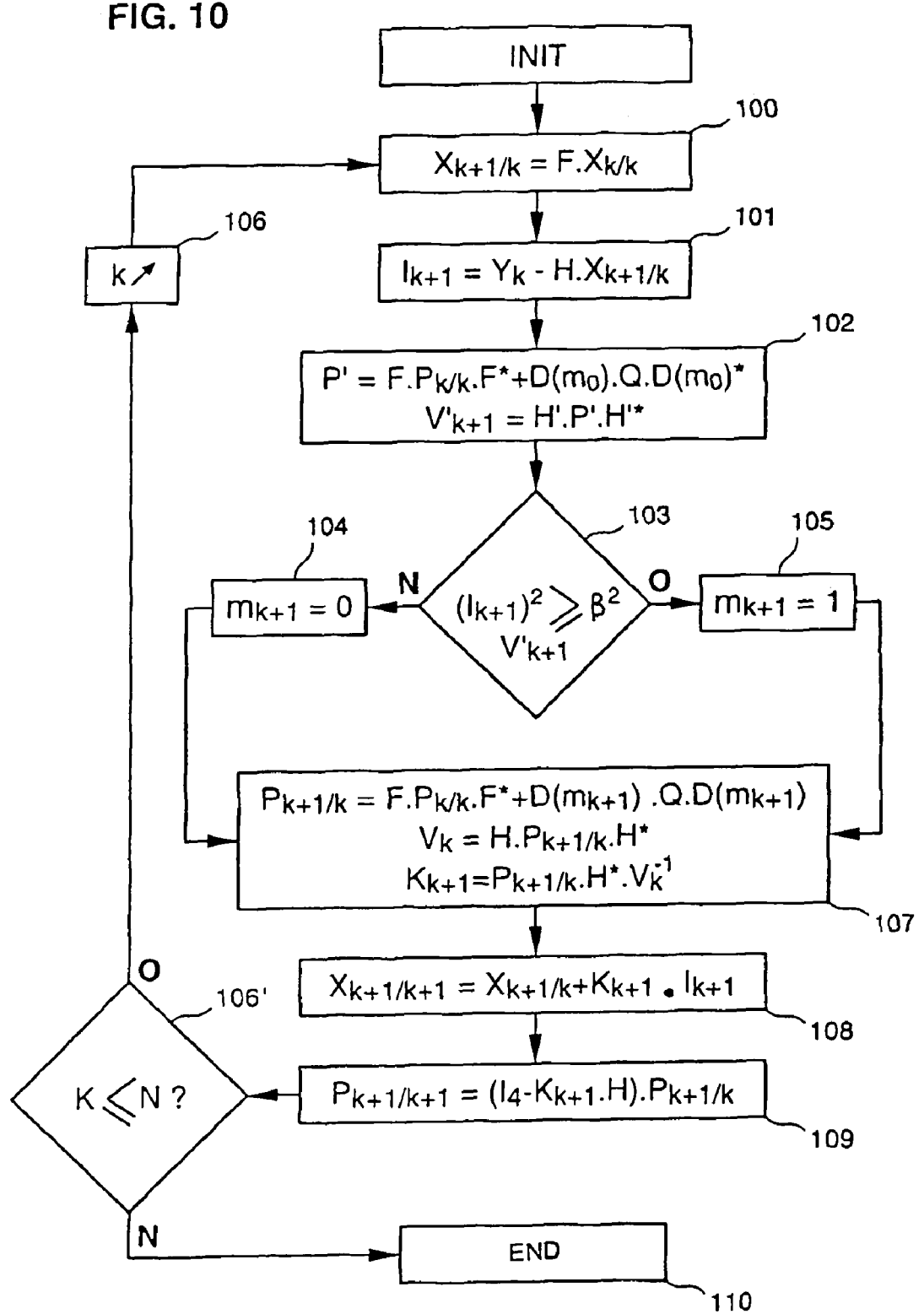
FIG. 10 shows a non-limiting example of instructions of an embodiment of the Kalman filter.

In this respect, a non-limiting example has been shown in FIG. 10 of instructions corresponding to this first step.

The first step consists of performing an initialisation of the parameters.

Instructions for this step are given below by way of non-limiting example. It will first be noted that the symbol * associated with a matrix denotes the conjugate matrix.

$k = 0$ $$X_{0/0} = \begin{bmatrix} 0 \\ b_0 \\ 0 \\ 0 \end{bmatrix}$$

$m_0 = 0$ $\beta$ is between 3 and 5

$$P_{0/0} = \begin{bmatrix} 0 & 0 & 0 & 0 \\ 0 & 1 & 0 & 0 \\ 0 & 0 & \sigma_n^2(1+\alpha^2) & -\alpha\sigma_n^2 \\ 0 & 0 & -\alpha\sigma_n^2 & \alpha^2\sigma_n^2 \end{bmatrix}$$

where $P_{0/0}$ is a matrix corresponding to the variance of the filtering error of estimate of $X_k$.

It can now be seen in FIG. 10 that the steps following this step of initialisation INIT are integrated into an incremental loop 106, 106' on the step k, beginning with k=0 and ending with k=N-1.

Attention is drawn in this respect to the fact that into this loop are integrated this first step of Kalman filtering, but also the second step described hereinafter.

The invention of course also provides for using each of these two steps independently, using a first loop in the first step and a second loop in the second step.

In any case, the first step commences with an initialisation at step k=0 particularly of the state vector $X_0/_0$, of the hidden Markov variable $m_0$ of the parameter β (preferably of the order of 3-5), and of the matrix $P_0/_0$ corresponding to the variance of the error of estimate of the state vector $X_k$.

Referring again to FIG. 10, the step which follows the initialisation step is step 100.

In this step 100, the prediction $X_k+1/_k$ is determined particularly from the estimate $X_k/_k$.

At the following step 101, the innovation $I_k+_1$ is determined, then at step 102 the variance of the innovation under the hypothesis $m_k$=0.

Step 103 corresponds to the test for determining whether the hypothesis of absence of a pulse at the step k+1 is true.

As may be seen in this step, the variance is multiplied by the square of the coefficient β, the result being compared with the square of the innovation I.

If the difference between the innovation and the multiple of the variance is greater than or equal to zero, the filter then considers that the hypothesis is false.

The occupation signal then having to indicate the presence of a pulse, the hidden variable at step k+1 takes the value 1.

Where appropriate, the occupation signal having to indicate the absence of a pulse, the hidden variable retains the value 0 at step k+1.

Figure 11:
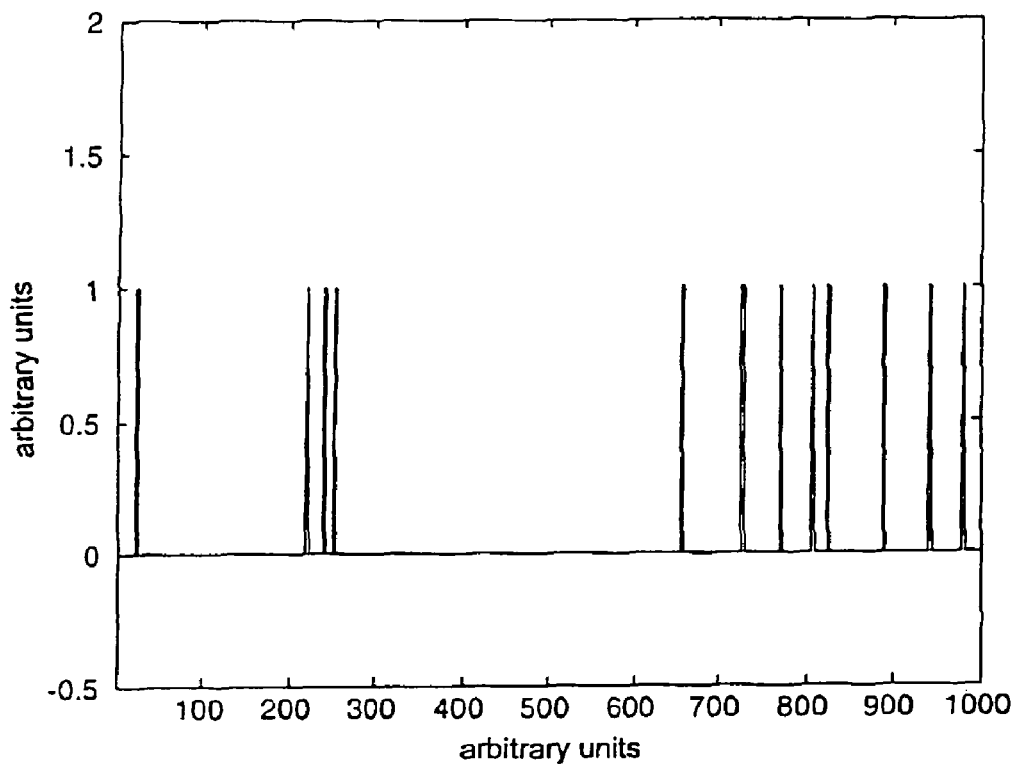
FIG. 11 shows an occupation signal obtained in the case where the observed time signal $y_k$ is that of FIG. 9.

As a guide, FIG. 11 shows the occupation signal obtained in the case where the observation signal $y_k$ is that of FIG. 9.

As may be seen, this signal comprises vertical bars of value 1, more or less spaced in time, and of greater or lesser duration.

Comparison with FIG. 2 shows that the first step of estimation of the occupation signal, and therefore of the hidden variable, functions well.

As previously mentioned, in the second step the occupation signal is used for updating the parameters of the state space model and in this way to obtain the filtered estimate signal $x_{k/k}$ by filtered estimate $X_k/_k$ of the state vector $X_k$.

Instructions 107-109 of this second step are given as a non-limiting example, still referring to FIG. 10, following on steps 104 or 105 according to the result of the test 103.

As may be seen, this second step particularly permits passing from the prediction $X_k+1/_k$ used in the first step, to the estimate $X_k+_1/_k+_1$ at the step k=1 (step 108).

Step 110 marks the end of the use of the Kalman filter so defined.

Therefore at this step 110 there is available an estimate signal $x_{k/k}$ of the signal $x_t$, in this instance of the detector current signal, this signal having less noise than the observation $y_k$ without recourse to an energy shaping step of the prior art.

In another embodiment of the invention, the estimate signal quality is further improved by using a second smoothing algorithm which treats the N samples in k decreasing steps and permits providing an improved smoothed estimate $X_k/_N$ of the state vector $X_k$.

Consequently this algorithm provides a smoothed estimate signal xk/$_N$ which it is desired to obtain.

Furthermore it will be noted that such a smoothed estimate $X_k/_N$ is an estimate conditional on the past, present and future.

This expression means for a statistician that it has been implemented essentially from samples of the observation signal $y_k$ as far as the step N and the samples of the state vector $X_k/_{k-1}$, determined beforehand by the first algorithm, and this from step k to N.

In a preferred alternative embodiment, this smoothing algorithm is constructed so as to maximise $X_k$, the probability of having the state vector $X_k$ at step k, knowing the N samples of the observation signal $y_k$, i.e., the probability $p(X_k/y1$ to $yN)$.

Figure 12:
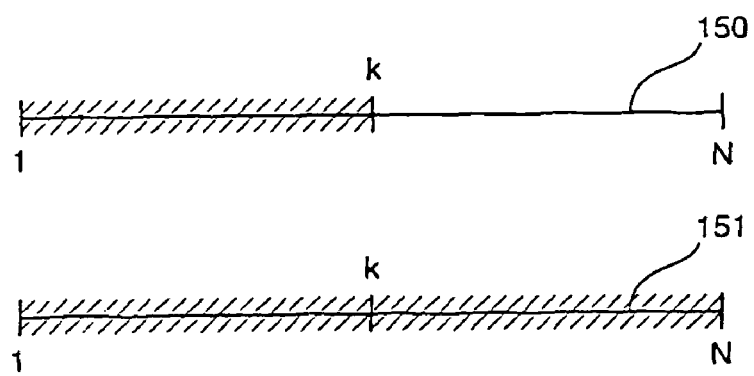
FIG. 12 is a time graph showing which samples are taken into account at a step k+1 in the case of the smoothing algorithm and in the case of the Kalman filter.

There is shown as an illustration in FIG. 12 a time graph showing which samples were taken into account in the case of smoothing (axis 151) and in the case of the Kalman filter (axis 150), knowing that in this Figure these two algorithms are assumed to perform calculations at step k+1.

Figure 13:
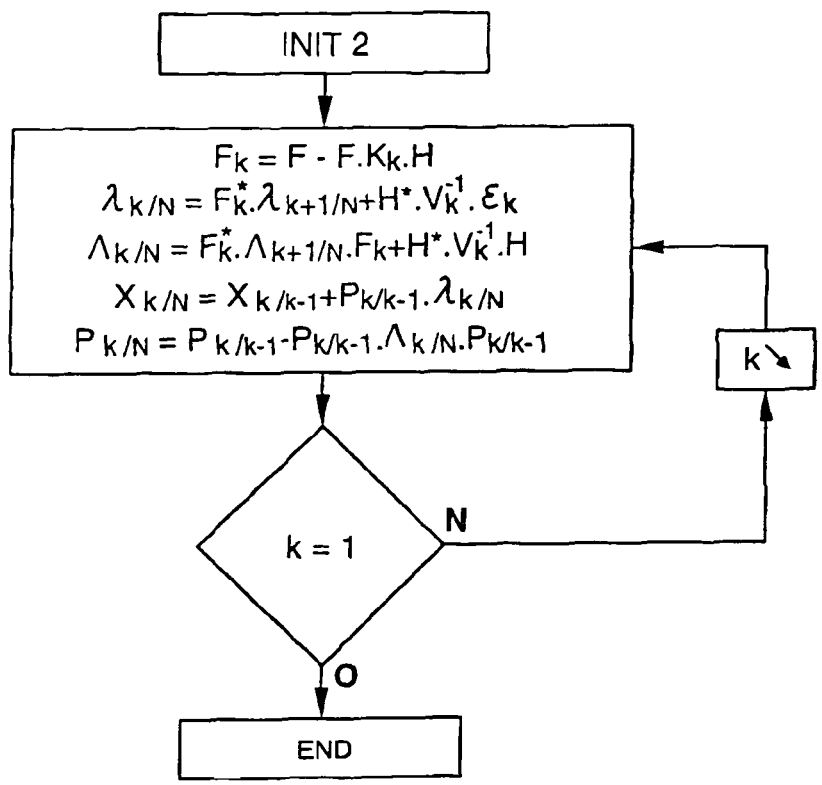
FIG. 13 shows, in a non-limiting way, steps of the smoothing algorithm.

Furthermore, steps of this smoothing algorithm are given in FIG. 13.

Briefly, the start here is again by proceeding to initialisation, denoted INIT2.

A decremental loop is then performed over k, in which the following calculations are effected:

$$F_k = F - F.K_k.H$$

$$\lambda_{k/N} = F^*_k . \lambda_{k+1/N} + H^* . V_k^{-1} . \epsilon_k$$

$$\Lambda_{k/N} = F^*_k . \Lambda_{k+1/N} . F_k + H^* . V_k^{-1} . H$$

$$X_{k/N} = X_{k/k-1} + P_{k/k-1} . \lambda_{k/N}$$

$$P_{k/N} = P_{k/k-1} - P_{k/k-1} . \Lambda_{k/N} . P_{k/k-1}$$

Figure 14:
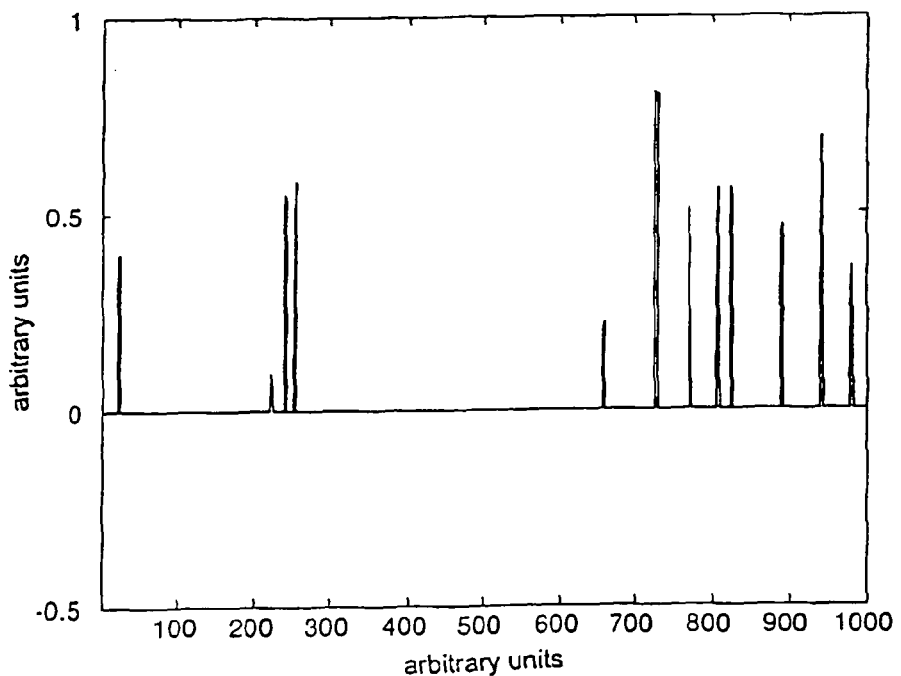
FIG. 14 shows an estimation signal obtained after implementing the Kalman filter, then the smoothing algorithm.

FIG. 14 shows the final non-noisy digital estimate signal $x_{k/N}$ resulting from the implementation of the above method.

It can be seen that the non-noisy digital estimate signal $x_{k/N}$ comprises pulses which correspond well to those of FIG. 9, and that the noise has disappeared.

An aim of the invention being to provide an energy spectrum of the radiation source studied, the method may furthermore comprise supplementary steps for generating an energy signal from an estimate signal $x_{k/k}$ or $x_{k/N}$ according to whether the Kalman filtering is implemented alone or this is completed by the smoothing algorithm.

For this purpose, the starting point is an analysis of the occupation signal to mark the instants when pulses are present.

The steps k corresponding to these instants are stored in the memory 24.

The estimate signal, for example $x_{k/N}$ is then used for searching and memorising its values in the memorised steps k.

Finally, supposing that the pulse energy is proportional to its amplitude or its area, for each among them the memorised values associated with the step k corresponding to them are added.

For example, if a ninth pulse in the occupation signal lasts for three steps k=10, 11, 12, and if for these three steps k the non-noisy digital estimation signal comprises respective values 1 keV, 1.1 keV and 1.05 keV, the determination of the energy of the ninth pulse will arrive at the result 3.15 keV.

Proceeding in this way for the set of pulses identified in the occupation signal, the method is then able to provide a histogram of energies estimated in this way.

According to an alternative, the preceding energy estimate may also be refined by weighting the energies with a coefficient which represents, for example, an estimate of the quality of the finally obtained estimate.

It will be noted in this connection that the smoothing algorithm advantageously provides the variance of the error of estimate of smoothing, $P_{k/N}$.

One can therefore weight the previous estimate of energies by means of $P_{k/N}$.

One can also note that the Kalman filter also provides the variance of the filtering estimation error, noted as $P_{k/k}$.

However, the latter is less precise than that provided by the smoothing algorithm.

In all cases, the Applicant considers that the utilisation of such a weighting enables the generation of an energy histogram of better quality.

By way of indication, it is now noted that the method of the invention initially comprises steps which enable, particularly, the best estimation of the level of baseline of the signal (or bias) in order to begin, for example, Kalman filtering under the best conditions.

This is performed by means of a robust method consisting of taking the mode of the histogram of values taken by the first samples of the observation signal $y_k$.

As regards the noise parameters $\alpha$, $\sigma_n$, $\sigma_b$, they may be estimated by spectral analysis of the detector current signal, and for example in the regions where few pulses are present.

As for $\sigma_p$, it is generally fixed at a value much greater than $\sigma_n$ and $\sigma_b$.

In order to illustrate the efficiency and advantages of the method of the invention, a detailed embodiment will now be presented of an experimental system designed by the Applicant, as well as measurement results obtained therewith.

The invention is of course not limited to this embodiment, and those skilled in the art will understand that numerous possible alternatives exist of such a system as well as the measurement results obtained therewith.

Figure 15:
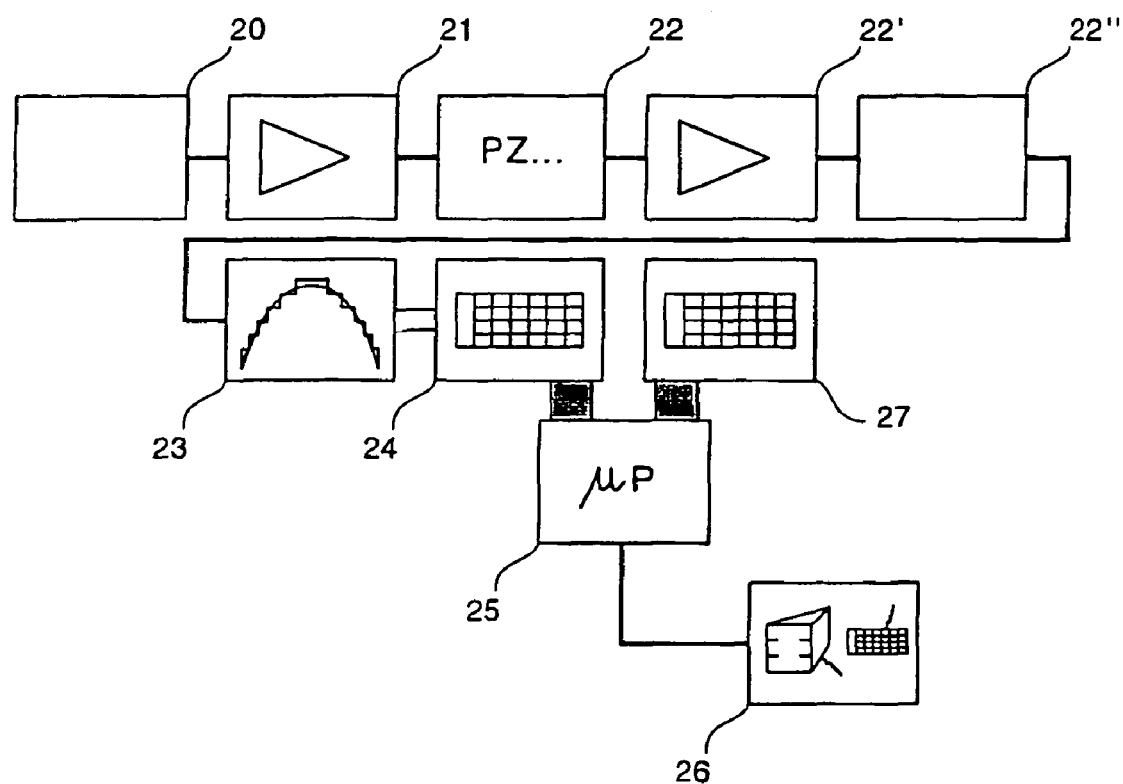
FIG. 15 shows schematically an experimental system capable of implementing the method of the invention and enabling the efficiency and advantages of the invention to be illustrated from measured results.

Referring to FIG. 15, the blocks 20-25 present in FIG. 7 are again found, that is, from upstream to downstream:
- a detector 20,
- a conditioning chain comprising a preamplifier 21, a block 22 in which a pole-zero correction circuit PZ or a differentiating circuit is used, according to the choice of preamplifier type 21, and an A/D converter 23,
- a memory 24 for storing signals and a memory 27 for storing energies controlled by a calculating unit 25.

Nevertheless, a difference from the system of FIG. 7 is that the conditioning chain CH additionally comprises an amplifier 22' and an anti-aliasing filter 22' located between the block 22 and the A/D converter 23.

Discussion of a Design of Blocks 21-22"

Firstly it is appropriate to limit a saturation of the amplifier 22', particularly because of too high a counting rate.

With this aim, it is proposed to filter the output signal of the preamplifier 21, using the block 22 (pole-zero for the resistive preamplifier, high-pass for return to zero) such that the time constant of the residual pole is of the order of 500 ns in the present case.

In fact such a value enables operation at input rates of several million per second.

The use of present, more highly developed technologies, and the advance of technologies itself, will of course enable a reduction of this time constant and further improved performance of the system.

Analogue/digital Converter 23

Histograms relating to $2^{14}$ channels are to be constructed here.

Taking into account the technology used, a converter having a resolution of 14 bits has been retained.

The sampling frequency fe is at present limited by the performance of converters and by the ability of the calculation unit to perform the treatment of the flow of digitised data in real time.

The pass band of signals coming from the detector 20 may exceed 30 Mhz, which would result in a prohibitive sampling rate for the present technology.

This is why it is proposed to insert in the conditioning chain, upstream of the conversion, a spectrum anti-aliasing filter 22" which ensures a sufficient attenuation of the frequencies greater than half the sampling frequency.

A permissible sampling rate is between 10 and 20 Mhz at present.

Numerical Processing Unit (Blocks 24-27)

This unit should be dimensioned to perform the calculations relating to the given algorithms.

It may for example be a commercially available processor.

The samples are passed after the converter 23 into the memory 24 of the segment calculating unit.

To process all the samples, the invention proposes, by way of a non-limiting example, a "ping-pong" operation: a segment of samples is stored in memory while the calculating unit processes a region situated in another portion of its memory.

At the output of an operation of the Kalman filter and then of the smoothing algorithm, the pulses are indexed by analysing the occupation signal as previously described, and the corresponding energies are stored in the memory 27.

In this respect it will be noted that the memories 24 and 27 are not necessarily separate from the calculating unit 25.

In this instance, in the system presented here, the memories are integral portions of the memory of this unit 25.

The following values were measured with a prototype system whose implementation is described in the foregoing paragraph. In particular, the calculating power available in this system does not permit going beyond a sampling rate of 10 Mhz on 14 bits.

In spite of this, it is possible to attain a counting rate of 5 million per second with a standard coaxial germanium detector of 20% efficiency.

At all counting rates, the spectra provided are compatible with commercial gamma spectrum processing software; in particular, the peak shapes are gaussian.

The resolution typically attained at low counting rates is 1.7 keV at 1332 keV, a little better than the constructor resolution announced of 1.8 keV, particularly because of very careful analogue electronics.

The resolution decreases with increase of the counting rate, but for example about 2 keV at 1332 keV and 100,000 counts per second (ICR) and about 3 keV at 1332 keV and 1 million counts per second (ICR) is nevertheless attained, these examples being given taking into account an increasing perturbing source of cesium 137 and a stable cobalt 60 reference.

As mentioned previously, the method of the invention adjusts automatically in real time to the counting rate.

Consequently, during this experiment, an initial adjustment was implemented, but no other intervention of this type occurred once the method was started, despite a change in counting rate during the execution of the method.

Numerous modifications could of course be made without departing from the scope of the invention.

The invention claimed is:

1. Method of processing a noisy digital time signal $y_k$ corresponding to an initial time signal $x_t$ after having been conditioned by a conditioning chain, said initial signal $x_t$ being representative of information about radiations (30) coming from a radiation source, these radiations (30) having an energy distribution, characterized in that a state space model is implemented, representing the conditioning imposed by the said chain for passing from the initial time signal $x_t$ to the noisy digital time signal $y_k$, in order to obtain from the noisy digital time signal $y_k$ a non-noisy digital estimate signal of the initial time signal $x_t$.

2. Method of processing according to claim 1, characterised in that it furthermore comprises a preliminary step in which the noisy digital time signal Yk is partitioned into successive segments of N samples, so as to obtain a non-noisy digital estimate signal.

3. Method of processing according to one of the foregoing claims, characterised in that the state space model comprises:
a variable $m_k$ to be estimated, of hidden variable type, able to have a value at each sampling step k of one value among two, indicating the presence or absence of one or more pulses in the initial time signal $x_t$, at the instant corresponding to the step k in question,
a state vector $X_k$ to be estimated, comprising a first component which corresponds to a digitised representation $x_k$ of the initial time signal $x_t$ at the instant corresponding to the step k in question.

4. Method of processing according to claim 3, characterised in that the hidden variable $m_k$ is a Hidden Markov variable which may equal, at each sampling step k, the value 1 if the non-noisy digital estimate signal should comprise one or more pulses in the sampling step k in question, and the value 0 if the non-noisy digital estimate signal should not comprise any pulses in the said sampling step k.

5. Method of processing according to claim 3, characterised in that it furthermore comprises a step in which an algorithm is implemented which processes the N samples in increasing steps k and which cooperates with the state space model for providing a filtered estimate $X_{k/k}$ of the state vector $X_k$, and so to provide a non-noisy filtered digital estimate signal $X_{k/k}$ which it is desired to obtain, this filtered estimate signal $X_{k/k}$ corresponding to a filtered estimate conditional on the past.

6. Method of processing according to claim 5, characterised in that it furthermore comprises a step in which an algorithm is implemented which processes the N samples by increasing steps k, and which cooperates with the state space model to provide a filtered estimate $X_{k/k}$ of the state vector $X_k$, and so to provide a non-noisy filtered digital estimate signal $X_{k/k}$ which it is desired to obtain, this filtered estimate signal $X_{k/k}$ corresponding to an estimate signal conditional on the past of the samples of the noisy digital time signal $y_k$ up to the step in question.

7. Method of processing according to claim 5, characterised in that the algorithm is a Kalman filter, an observation of which corresponds to the noisy digital time signal $y_k$.

8. Method of processing according to claim 3, characterised in that it comprises a step in which the hidden variable $m_k$ is estimated at each step k, in order to obtain an occupation signal representative of an estimate or the presence or not of one or more pulses in each of the steps k in question, and in that the filter is capable of determining, by means of the said obtained occupation signal, the filtered estimate $X_{k/k}$ of the state vector $X_k$, and so to determine the non-noisy filtered digital estimate signal $X_{k/k}$ which it is desired to obtain.

9. Method of processing according to claim 3, characterised in that the estimate of the hidden variable $m_k$ is implemented by making a hypothesis according to which, at the instant corresponding to the sampling step k considered, there are no pulses in the initial time signal $x_t$, then verifying if the hypothesis is true by means of a comparison of the square of an innovation I of the Kalman filter and a threshold variable determined by the latter.

10. Method of processing according to claim 9, characterised in that the innovation I is of the form:

$I_{k+1} = Y_{k+1} - Y_{k+1/k}$ where $y_{k+1}$ is the observation at the sampling step k+1 and $y_{k+1/k}$ is a prediction of this observation, at the step k+1, calculated from a prediction $X_{k+1/k}$ determined beforehand of the state vector $X_k$ at the step k+1.

11. Method of processing according to claim 9, characterised in that the threshold variable consists of a coefficient multiplied by a variance of the innovation I.

12. Method of processing according to claim 3, characterised in that it furthermore comprises a step in which a second algorithm is implemented, termed smoothing algorithm, which processes the N samples by decreasing steps k and which enables provision of an improved smoothed estimate $X_{k/N}$ of the state vector $X_k$, and so the provision of an improved smoothed estimate $X_{k/N}$ of the signal which it is desired to obtain, this estimate being an estimate conditional on the past, present and future from samples of the observation signal $y_k$ as far as the step N and the samples of the state vector $X_{k/k-1}$ determined beforehand by the first algorithm from the steps k to N.

13. Method of processing according to claim 12, characterised in that the smoothing algorithm is constructed such that the smoothed estimate $X_{k/N}$ maximises in the state vector $X_k$ the probability of having the state vector $X_k$ at the step k, knowing the N samples of the noisy digital time signal $y_k$, that is, the probability:

$P(X_k/y_1$ to $y_N)$.

14. Method of processing according to claim 12, characterised in that the energy of each pulse is weighted as a function of a measurement of an obtained quality of the estimate signal, this measure being determined by the Kalman filter or the smoothing algorithm.

15. Method of processing according to claim 1, characterised in that it furthermore comprises a step in which the energy of the radiations is determined by implementing the following operations:
search and memorise the step(s) k of each pulse present in the occupation signal,
for each pulse, read the value of the estimate signal at the memorised step(s) k corresponding to the pulse considered, and add the values thus obtained so as to obtain an energy estimate for the pulse in question.

16. Method of processing according to claim 1, characterised in that it furthermore comprises a step in which an energy histogram of the radiation source is constructed from the energies determined.

17. Method of processing according to claim 16, characterised in that the energy histogram represents an energy spectrum.

18. Method of processing according to claim 1, characterised in that the radiations are particle radiations.

19. Method of processing according to claim 1, characterised in that the radiations are nuclear particle radiations.

20. Method of processing according to claim 1, characterised in that the radiations are photon radiations.

21. The method of processing according to claim 1, characterised in that it furthermore comprises a step of detection of the radiations which provides the time signal $x_t$.

22. The method of processing according to claim 1, characterised in that the conditioning of the initial time signal $x_t$ by the conditioning chain begins with a first step in which the initial signal $x_t$ is preamplified and ends at a step of sampling at a predetermined frequency fe, so as to obtain the noisy digital time signal $y_k$.

23. A non-transitory computer readable medium intended to perform processing of a noisy digital time signal $Y_k$ corresponding to a time signal $x_t$, said signal $x_t$ being representative of information about radiations coming from a radiation source, these radiations having an energy distribution, characterised in that it implements the method of processing according to claim 1.

24. System of processing a noisy digital time signal $y_k$ corresponding to an initial time signal $x_t$ after having been conditioned by a conditioning chain, said initial signal $x_t$ being representative of information about the radiations coming from a radiation source, these radiations having an energy distribution, characterised in that it comprises means capable of implementing a state space model, representative of the conditioning imposed by said chain to pass from the initial time signal $x_t$ to the noisy digital time signal yk, in order to obtain from the noisy digital time signal Yk a non-noisy digital estimate signal of the initial time signal $x_t$.

25. System according to claim 24, characterised in that the state space model comprises:
- a Hidden Markov variable to be estimated, which may be equal to the value 1 if the non-noisy digital estimate signal should comprise one or more pulses at the sampling step k, and to the value 0 if the non-noisy digital estimate signal should not comprise any pulse in the sampling step k,
- a state vector $X_k$ to be estimated, comprising a first component which corresponds to digitized representation $y_k$ of the initial time signal $x_t$ at the instant corresponding to the step k in question.

26. System according to claim 24, characterised in that it furthermore comprises means for implementing a Kalman filter, an observation of which corresponds to the noisy digital time signal $y_k$, the Kalman filter cooperating with the state space model to provide a filtered estimate $X_{k/k}$ of the state vector $X_k$, and so to provide a non-noisy filtered digital estimate signal $x_{k/k}$ which it is desired to obtain, this filtered estimate being a filtered estimate $X_{k/k}$ conditional on the past from samples of the noisy digital time signal $y_k$ up to the step k in question.

27. System according to claim 24, characterised in that it comprises means for implementing a smoothing algorithm.

28. System according to claim 27, characterised in that the smoothing algorithm is constructed so as to maximize in the state vector $X_k$ the probability of having the state vector $X_k$ at the step k knowing the N samples of the noisy digital time signal yk; that is, the probability $p(X_k/y_1 \text{ to } y_N)$.

29. System according to claim 27, characterised in that the state space model, the Kalman filter and the smoothing algorithm are implemented by a calculating unit (25).

30. System according to claim 29, characterised in that the calculating unit (25) is a processor.

31. System according to claims 24, characterised in that the conditioning chain comprises a preamplifier (21) and an analogue/digital converter (23).

32. System according to claim 31, characterised in that the preamplifier (21) is of the type chosen from the following list:
preamplifier with resistive feedback,
preamplifier with capacitive feedback.

33. System according to claim 24, characterised in that the conditioning chain furthermore comprises at the output of the preamplifier (21): a pole-zero correction circuit (22) if the preamplifier is of the type with resistive feedback, or a differentiating circuit (22) if the preamplifier is of the type with capacitive feedback.

34. System according to claim 24, characterised in that the conditioning chain furthermore comprises an amplifier (22').

35. System according to claim 24, characterised in that the conditioning chain furthermore comprises an anti-aliasing filter (22").

36. System according to claim 35, characterised in that the conditioning chain comprises successively, from upstream to downstream, the preamplifier (21), the differentiating circuit (22) if the preamplifier is of the type with capacitive feedback, or the pole-zero correction circuit (22) if the preamplifier is of the type with resistive feedback, the amplifier (22'), the anti-aliasing filter (22"), and the analogue/digital converter (23).

37. System according to claim 24, characterised in that it comprises memory means (24, 27) for memorising particularly, the signals, the state space model, the Kalman filter, and the smoothing algorithm.

38. System according to claim 24, characterised in that it comprises display means (26) for displaying in particular the results of the estimation and of data capture.

* * * * *

UNITED STATES PATENT AND TRADEMARK OFFICE
CERTIFICATE OF CORRECTION

PATENT NO. : 7,885,775 B2
APPLICATION NO. : 11/057650
DATED : February 8, 2011
INVENTOR(S) : Eric Barat, Thomas Dautremer and Jean-Christophe Trama Page 1 of 1

It is certified that error appears in the above-identified patent and that said Letters Patent is hereby corrected as shown below:

Column 4, line 66, "$p(X_k/y1$ to $y_N)$" should read --$p(X_k/y1$ to yN)--.
Column 17, line 3, "Yk" should read --$Y_k$--.
Column 19, line 13, "yk" should read --$Y_k$--.
Column 19, line 14, "yk" should read --$Y_k$--.
Column 20, line 2, "yk" should read --$Y_k$--.
Column 20, line 10, "claims" should read --claim--.

Signed and Sealed this
Thirty-first Day of January, 2012

David J. Kappos
*Director of the United States Patent and Trademark Office*